(12) United States Patent
Bettini

(10) Patent No.: US 9,119,352 B1
(45) Date of Patent: Sep. 1, 2015

(54) GROUND COVER BLADDER AND FERTILIZER CARTRIDGE

(71) Applicant: Charles Randall Bettini, Browns Summit, NC (US)

(72) Inventor: Charles Randall Bettini, Browns Summit, NC (US)

(*) Notice: Subject to any disclaimer, the term of this patent is extended or adjusted under 35 U.S.C. 154(b) by 109 days.

(21) Appl. No.: 14/048,438

(22) Filed: Oct. 8, 2013

Related U.S. Application Data

(60) Provisional application No. 61/711,442, filed on Oct. 9, 2012.

(51) Int. Cl.
*A01G 29/00* (2006.01)

(52) U.S. Cl.
CPC ...................................... *A01G 29/00* (2013.01)

(58) Field of Classification Search
CPC ... A01G 29/00; A01G 21/00; A01G 13/0256; A01G 13/0268; A01G 13/0281
USPC .................................. 47/48.5, 20.1, 31, 23.2
See application file for complete search history.

(56) References Cited

U.S. PATENT DOCUMENTS

| | | | | |
|---|---|---|---|---|
| 1,554,865 A | * | 9/1925 | Magoon | 47/48.5 |
| 3,857,195 A | * | 12/1974 | Johnson | 47/32 |
| 5,421,123 A | * | 6/1995 | Sakate et al. | 47/56 |
| 6,195,935 B1 | * | 3/2001 | Bellucci et al. | 47/9 |
| 6,739,088 B1 | * | 5/2004 | Stoller | 47/31 |
| 7,707,771 B1 | * | 5/2010 | Hawkins | 47/48.5 |
| 2004/0013824 A1 | * | 1/2004 | Sibbet | 428/17 |

FOREIGN PATENT DOCUMENTS

EP 165112 A1 * 12/1985 ............. A01G 27/00

* cited by examiner

*Primary Examiner* — Kristen C Hayes
(74) *Attorney, Agent, or Firm* — MacCord Mason PLLC

(57) ABSTRACT

A weed/grass control and fertilizing device is shown and described. In one embodiment, the device comprises a bladder socket having a bottom surface blocker, a screen and a water-permeable barrier. The bladder socket includes at least one sleeve and may be installed around a trunked tree. In other embodiments, a replaceable fertilizer cartridge may be positioned within the sleeve. The result are devices and methods for harmonizing weed/grass control and fertilizing of trunked plants.

11 Claims, 9 Drawing Sheets

GROUND COVER BLADDER AND FERTILIZER CARTRIDGE

This application claims the benefit of provisional application No. 61/711,442, filed Oct. 9, 2012, which is incorporated herein by reference in its entirety.

FIELD OF THE TECHNOLOGY

The present disclosure relates generally to a ground cover for plants and crops, and more particularly, to improved weed control and fertilizing devices, systems, and methods.

BACKGROUND

Vineyards are often grown on hillsides to maximize the amount of sunlight that falls on the vineyard. For this reason, vineyards on steep hills provide sufficient drainage to reduce unnecessary water pooling, which often discourages plant undergrowth. However, fertilizing and monitoring and controlling pests and weeds around the vines remains an important process in viniculture. For instance, grass and weeds are one significant hurdle of a grape vine's proper growth. Typically, vines in a weed-infested vineyard struggle against the competition for water and nutrients from the weeds and grass growing adjacent to the vines.

One solution to suppressing weed growth in vineyards, and the like, is mulching. Mulching helps block sunlight to reduce unwanted ground cover undergrowth, and in addition the mulch reduces moisture loss to help keep the soil moist. However, mulching a vineyard has several disadvantages. For example, mulching a vineyard is costly, as rows and rows of individual vines require a significant volume of mulch for proper coverage, as well as costly maintenance personnel support. Further, mulch poses a fire hazard during hot, dry summers, as the vines are purposely positioned on the hillsides to be exposed to extended hours of direct sunlight. Additionally, in wet environments, or poorly-drained soils, the mulch may hold excessive moisture, thus forcing vine growth that may fail to harden off in the fall and resulting in collar rot (harm caused to the stem of the vine due to composting material), winter injury or the like.

Another traditional weed control solution on vineyard slopes is to landscape with newspapers, or the like, to decrease routine maintenance. Again, mulch is often applied on top of the newspapers for additional weed control and beautification. However, these traditional methods gradually fail, for example due to wear of the newspapers and sliding downhill due to wind, rain, foot traffic and the like. Further, weeds often grow through the newspapers, therefore diminishing the value of this type of maintenance procedure. Additionally, this newspaper strategy is not aesthetically appealing, which detracts from the countryside ambiance of the vineyard. Still further, the layer of newspapers may act as a shield to block nutrients from reaching the root system, for instance the benefits of natural leaf composting, and the like, may be lost.

As such, a further viniculture challenge is proper fertilization of the grape vines, both at a young age and during mature growth. Therefore, organic and inorganic material of natural and synthetic origin are added to the soil surrounding the vines to supply one or more plant nutrients that are essential for maximizing healthy plant growth. However, erosion, and the like, of the fertilizer is common due to the steep slopes of vineyards. Further, the traditional weed and grass control methods described above often pose a challenge to fertilization.

Therefore, Applicants desire systems and methods for harmonizing weed/grass control and fertilizing without the drawbacks presented by the traditional systems and methods, while minimizing environmental impact.

SUMMARY

In accordance with the present disclosure, a device is provided for weed and grass growth deterrent, bug and animal blockage and a slow-release of point source fertilizer for a trunked tree. This disclosure provides an improved bladder assembly that is convenient, efficient, and safe for the user, particularly when semi-permanently installed around the trunked tree, including a grape vine in a vineyard. This disclosure also provides replaceable fertilizer cartridge plugs to be installed in the bladder socket.

One aspect of the present disclosure is to provide a bladder socket having a bottom surface blocker, a screen and a water-permeable upper barrier that is generally affixed to the bottom surface blocker to define at least one sleeve. The screen may be a fiberglass screen that is affixed to the bottom surface blocker. The bladder socket may be adapted to be installed around a trunked plant. The bladder may include a wrapping sleeve that is generally adapted to encircle substantially three hundred and sixty degrees around the trunked plant. The bladder socket may include a trunk slit that is adapted to enclose a trunk of a tree. In some examples, the bladder may include a first sleeve on one side of the trunk slit and an independent second sleeve on the opposing side of the trunk slit.

Another aspect of the present disclosure is to provide a point-source fertilizing and weed control device for a tree having a trunk. The device may include a bottom surface blocker and a water-permeable upper barrier (i.e. another blocker), a screen and a replaceable fertilizer cartridge. Typically, the bottom surface blocker and the water-permeable barrier are partially secured together to define a bladder having at least one sleeve opening. The screen may be affixed to the bottom surface blocker. Further, the replaceable fertilizer cartridge may be adapted to be positioned within the sleeve. The bladder is adapted to enclose, for instance encircle, substantially three hundred and sixty degrees around the trunk.

In some examples, the bottom surface blocker and the water-permeable barrier are stitched together to define the bladder. Further, the bladder may include a trunk slit that is generally adapted to enclose the trunk of the tree. The bladder may include a first sleeve on one side of the trunk slit, while a second sleeve may be positioned on the opposing side of the trunk slit. The screen may be a fiberglass screen pad. The fiberglass screen pad may be stitched to the bottom surface blocker.

Further, the fertilizer cartridge may include a bottom biodegradable surface and a top biodegradable surface. In some examples, the bottom biodegradable surface and the top biodegradable surface are stitched together along at least three sides. The fertilizer cartridge may include a composition that is chosen from an organic fertilizer and a non-organic fertilizer. In yet other examples, the fertilizer cartridge includes a secondary screen.

Yet a further aspect of the present disclosure is to provide a fertilizer cartridge for a point-source fertilizing and weed control device. The fertilizer cartridge may include a bottom biodegradable surface, a top biodegradable surface and an opening. The top biodegradable surface may be stitched to the bottom surface, for instance along at least three sides thereby defining the cartridge. In this example, the opening may be on the unstitched side of the cartridge. Further, the opening may be adapted to receive a fertilizer composition. A seal may be used to seal the opening. In some examples, the fertilizer cartridge includes organic fertilizer. Yet in other examples, the fertilizer cartridge includes non-organic fertilizer.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
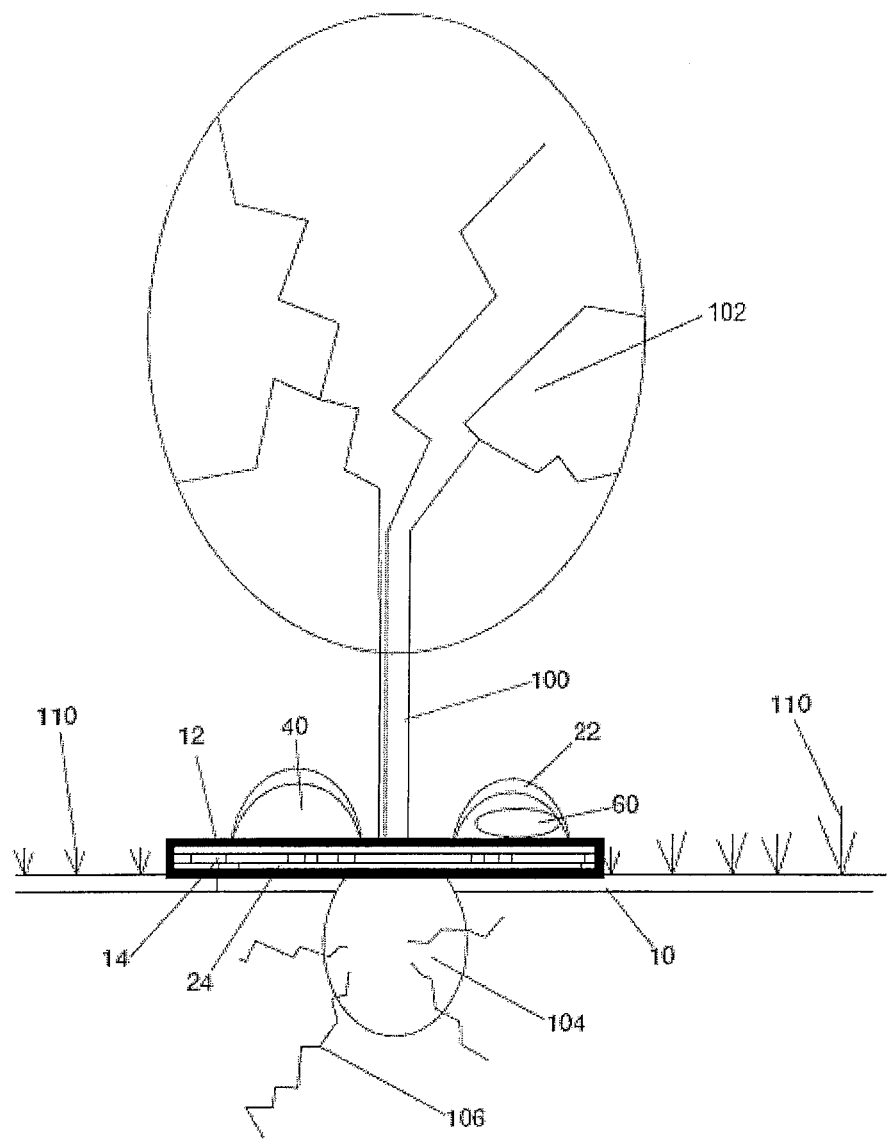
FIG. 1 is a schematic, cross-sectional view of a bladder assembly and trunked tree environment according to an embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2A:
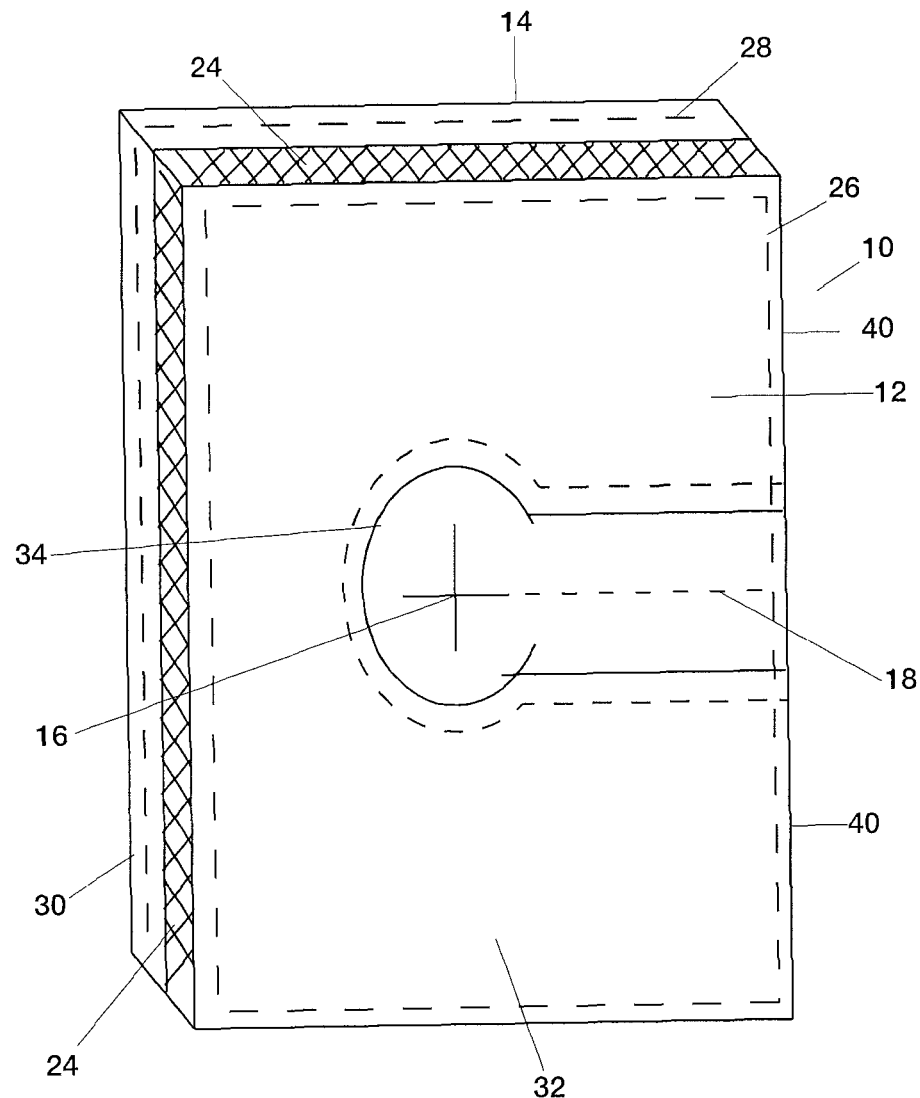
FIG. 2A is a top perspective view of the embodiment of FIG. 1.
Figure 7:
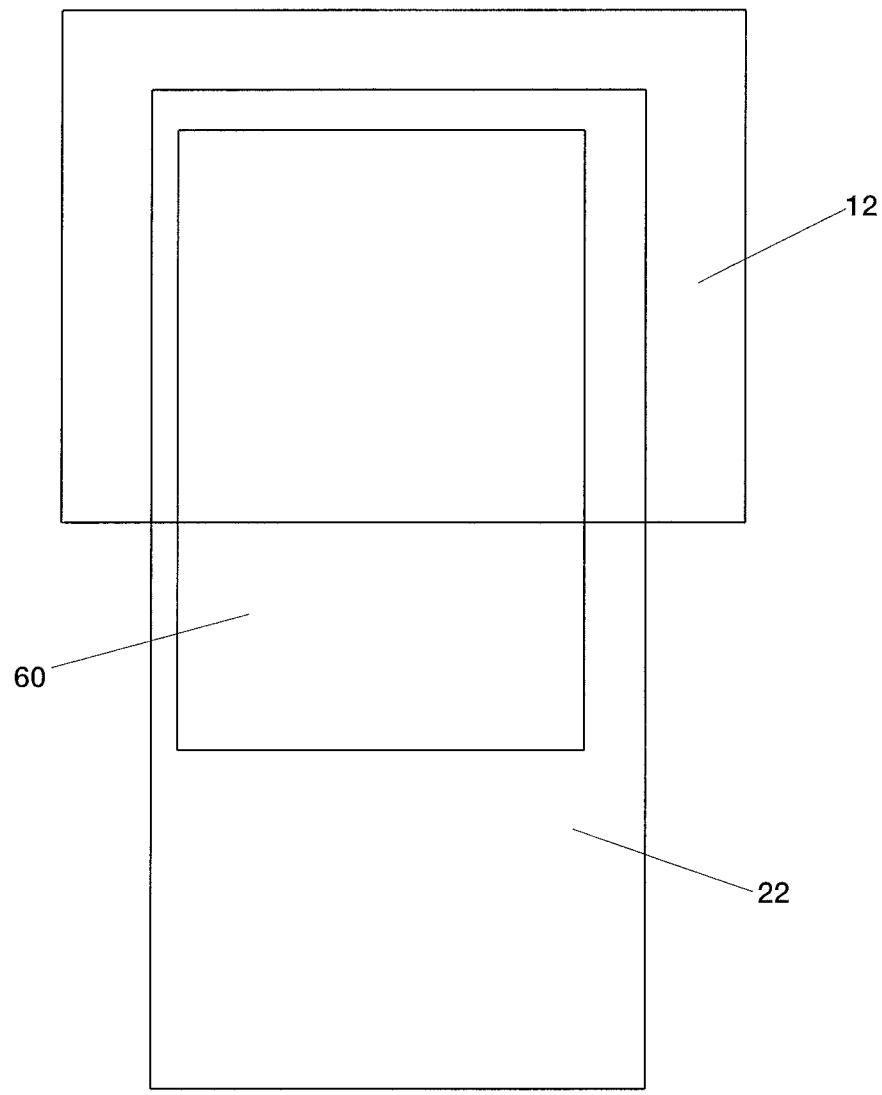
FIG. 7 is a top, partially-exploded view of a bladder assembly embodiment.

Referring now to the drawings in general, and FIGS. 1, 2A, and 7 in particular, it will be understood that the illustrations are for the purpose of describing embodiments of the disclosure and are not intended to limit the disclosure or any invention thereto. As best seen in FIG. 1, a bladder assembly 10 is shown embodied according to the present disclosure being installed around the trunk 100 of tree 102. The term 'tree' and 'vine' are used interchangeably herein to describe a trunked plant or the like. Typically, bladder 10 provides, inter alia, weed and grass growth deterrent, bug and animal barrier blockage and a slow-release of point source fertilizer for the root system 106. Bladder 10 is shown positioned above the root ball 104 generally above the ground surface and encircles the trunk 100, thereby deterring weed/grass 110 growth between the bladder 10 and the cordons of the vine/tree 102. As shown in FIG. 1, the bladder 10 acts as a semi-permanently installed socket to receive the fertilizer cartridge 60 plug. As shown and described herein, the fertilizer cartridge 60 may be replaceable. Bladder 10 is typically comprised of a bottom surface blocker 14, a water-permeable upper barrier 12 and a fiberglass screen 24 there between. The replaceable fertilizer cartridge 60 is typically selectively positionable within the sleeve 40 opening between the fiberglass screen 24 and the water-permeable barrier 12. In particular examples, the replaceable fertilizer cartridge 60 may include a secondary screen for top and side surface protection with respect to the cartridge resting above the ground surface.

FIG. 1 shows one embodiment of bladder 10 installed on the ground surface around a grape vine 102, however other examples include use on a variety of trunked vines, trees and the like. For instance, unexpected successful results have been discovered with the point-source fertilizing and weed control system on blueberry trees, apple trees, and the like. Those of ordinary skill will recognize the devices described herein provide advantages of point-source fertilization and weed control in a variety of commercial, residential and landscaping applications. Further, both the bottom surface blocker 14 and a barrier 12 are typically water-permeable for nutrient and water drainage, as described herein.

FIG. 2A shows an isolated view of one embodiment of an uninstalled bladder 10. As shown, the bladder 10 is an individual unit that may be installed around an individual trunked tree. The dimensions of the bladder 10 as illustrated may be about three feet wide by about three feet in length, for example to match the typical spacing between grape vines in a vineyard. However, other examples include larger and smaller bladder footprints to correspond to the characteristics of the particular trunked tree. Further examples include a plurality of bladder units connected end-to-end to fit within rows of trunked trees for greater coverage of the vineyard, or the like. In addition, the rows of bladder units may include any combination of spacer lengths of bottom surface blocker 14, screening 24 and water-permeable barrier 12 between each unit for complete weed suppression coverage along the rows for a more aesthetically-pleasing vineyard appearance.

As introduced above, the bladder generally includes a bottom surface blocker 14 and a water-permeable barrier 12 affixed together to define at least one sleeve 40. The sleeve 40 is sized to accept and retain at least one fertilizer cartridge. As shown in FIG. 2A, bladder stitching 28 may secure the bottom surface blocker 14 and a water-permeable barrier 12. For instance, the bottom surface blocker 14 may be stitched around at least three sides of the periphery of water-permeable barrier 12 with the sleeve side unstitched, or partially stitched. In these examples, the remaining open side may be partially stitched, or similarly fastened, together along the trunk slit as described hereinafter. In particular examples, the bladder stitching 28 includes 0.0025 inch threads, with a threading pattern of about five stitches per inch. However, other examples include a variety of stitching sizes and patterns to generally secure the bottom surface blocker 14 and a water-permeable barrier 12. In yet other examples, one or more sides of the bladder may be unstitched, partially stitched, glued, thermally boded or otherwise affixed.

The lower face 30 of the bladder is generally a primary protection shield with a bottom surface blocker 14 to block insects, moles, worts, and the like. In one example, the bottom surface blocker 14 is a constructed of recycled materials, for instance green scape material made from recycled bottles. Examples of the bottom surface blocker include a variety of thicknesses to match the particular soil and animal makeup of a particular application area and/or the characteristics of the trunked tree. One particular example includes a thickness of about 0.05 to about 0.020 inches, for instance about 0.010 inches. Unexpected results of a combination of weed control and fertilizer permeability have been discovered with a bottom surface blocker having a thickness of about 0.010 inches.

The screen 24 is a pad to provide a structural support for the bladder, yet porous or loose enough to allow fertilizer to permeate downward in a point-source manner as appreciated by those skilled in the art, for instance during a rain or irrigation event, from the cartridge to the root system. Typically the screen is secured to the bottom surface blocker 14, however in alternative examples the screen may be affixed to the water-permeable barrier 12. For instance, as shown in FIG. 2, the fiberglass screen 24 is stitched around the periphery of the bottom blocker 14 via screen stitching 26. In particular examples, the screen stitching 26 includes 0.0025 threads, with a threading pattern of about five stitches per inch. However, other examples include a variety of stitching sizes and patterns to generally secure the screen 24 and the bottom blocker 14. The screen 24 may be constructed of fiberglass, wire mesh and the like. In one example, the screen 24 is a fiberglass screen of wire and has a thickness of about 0.010 to about 0.014 inches, for instance about 0.010 inches. In yet other examples, the fiber glass screen may have a gage of about 18×16 per 1". Additional examples include a variety of screen arrangements and materials to generally support the foundation of the bladder and allow fertilizer to pass downward into the root system, for instance in an efficient point-source manner, thereby minimizing losses attributed to otherwise non-point fertilization. Generally the fertilizer is water soluble and is carried as dissolved in permeating rain or irrigation water.

The top face 32 of the bladder is generally a primary protection shield that is secured around the trunk of the tree. As shown in FIG. 2A, bladder may include a trunk slit 18 that may be pre-cut, or cut on-site, to slide the entire bladder into place around the trunk. The trunk slit 18 may be perforated to allow easy installation around the tree. Further, the top face includes a centering point 16 to align the trunk about the center of the bladder. A wrapping sleeve 34 includes any of the water-permeable barrier 12, the fiber glass screen 24 and/or the bottom surface blocker 14 elements described herein to generally wrap around the trunk to provide complete three hundred-and-sixty degree weed and grass suppression. The wrapping sleeve 34 also presents an aesthetically-pleasing ground cover arrangement. Other examples include a variety of wrapping styles and designs to maintain coverage around the trunk and thereby eliminate unwanted weed and grass undergrowth.

The top face 32 may include a water-permeable barrier 12 that acts as a bug and animal blocker that is water permeable to allow rain/irrigation to flow to the fertilizer cartridges, while being aesthetically pleasing. For instance, the water-permeable barrier 12 may be colored to match the look of a particular surface terrain, for instance green of a vineyard, or the like. Similar to the bottom blocker, in particular examples, the water-permeable barrier 12 may be a constructed of recycled materials. For instance the water-permeable barrier 12 may be comprised of green scape material made from recycled bottles. Examples of the water-permeable barrier include a variety of thicknesses to allow sufficient permeability, e.g. water flow, for a particular precipitation/irrigation application. Further, the thickness of the water-permeable barrier 12 may depend on the animal and bug makeup of a particular application area and/or the characteristics of the trunked tree. One particular example includes a water-permeable barrier 12 thickness of about 0.05 to about 0.020 inches, for instance about 0.010 inches. Unexpected results of a combination of animal control and rain/irrigation permeability have been discovered with a water-permeable barrier having a thickness of about 0.010 inches.

Figure 2B:
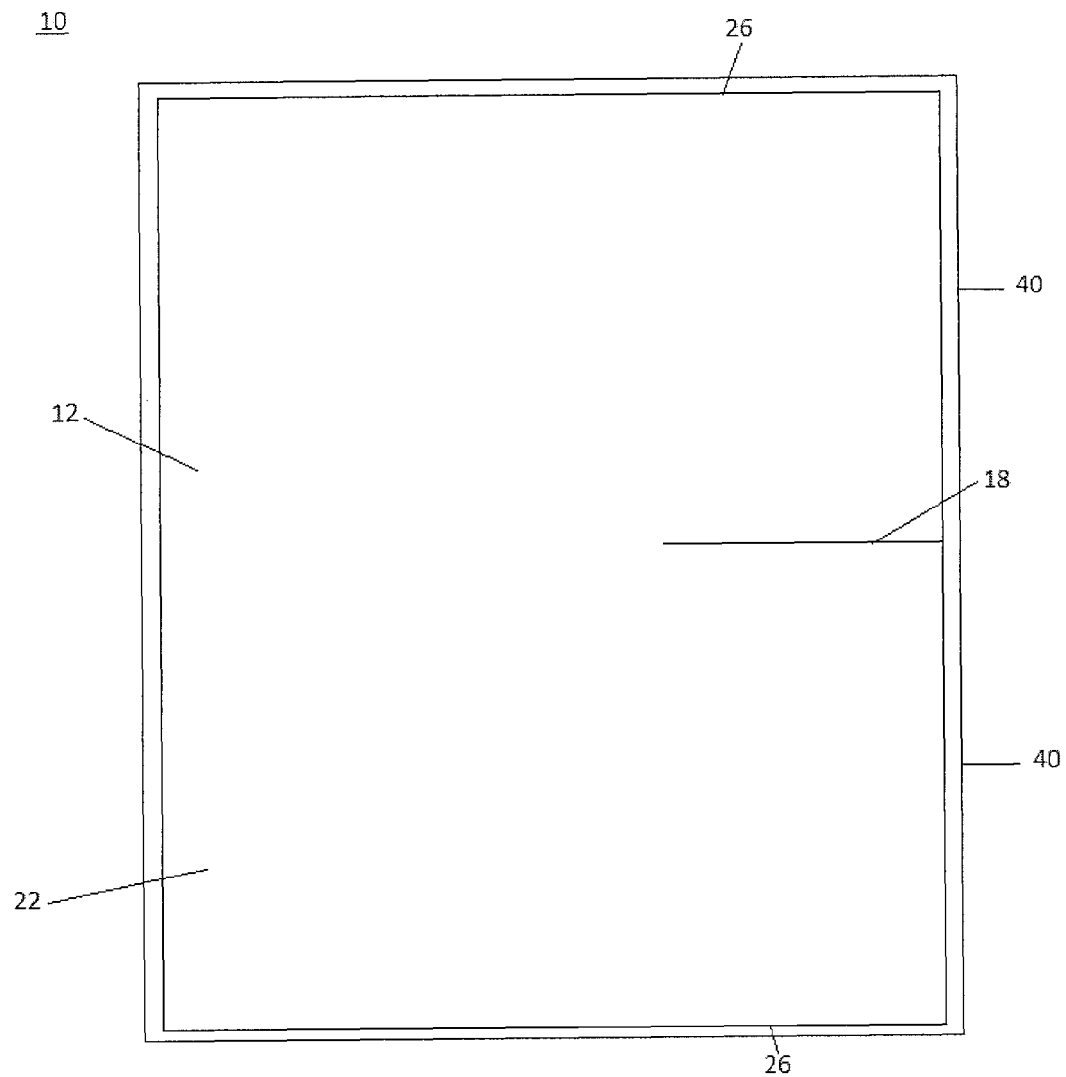
FIG. 2B is a top view of the embodiment of FIG. 1.

As shown in FIGS. 2A and 2B, at least one side of the bladder is partially unclosed to allow a cartridge to be fed into the system. In some examples, the cartridge is secured with snaps, fasteners, and the like and may be secured with stakes, for instance fork prongs protruding through the assembly into the ground surface. While in other examples the assembly is self-supported in place around the vine as shown and described herein. Typically, the cartridge is biodegradable as described hereinafter, so removal of the cartridge in some embodiments is unnecessary. In these examples, the cartridge degrades naturally and the user does not have to remove the depleted unit, however, other examples include removing partially depleted units. Alternative embodiments, however, provide for the cartridge to be removed after the fertilizer is depleted. As shown, the bladder may include two sleeves 40 on opposing sides of the trunk slit. The sleeves may extend through the length of the bladder to the bladder stitching 28. Other examples include a shortened sleeve length. Still other examples include a variety of sleeve sizes and dimensions to accept and retain a variety of fertilizer cartridge embodiments.

A introduced above, a fastener may releasably retain the open ends of the sleeve 40, for instance once a cartridges has been inserted. The fastener may include Velcro, snaps, buttons and the like. In yet other embodiments, the bladder may include only one sleeve to meet the needs of particular vine or tree, or to accept and retain an alternatively-shaped fertilizer cartridges, including, but not limited, to a U-shaped cartridge, or the like. Still further embodiments include a bladder with more than two sleeves, for instance to house a variety of specific fertilizer cartridges to complement the local soil inadequacies and/or tree demands.

Figure 3:
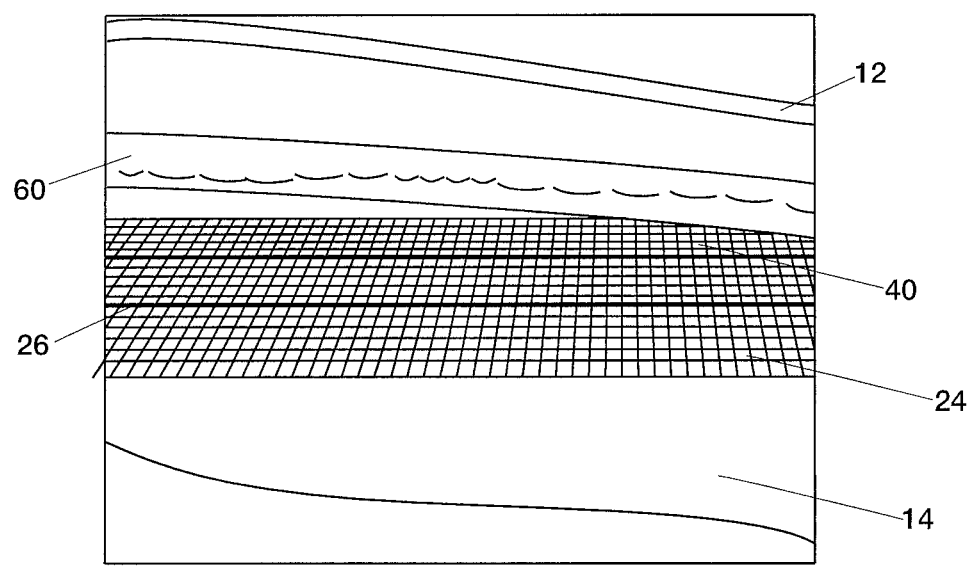
FIG. 3 is an enlarged, side-perspective view of the embodiment of FIG. 2A.

FIG. 3 shows one example of a cartridge 60 located within the sleeve 40 between the bottom surface blocker 14 and the water-permeable barrier 12. The fiberglass screen 24 is affixed to the bottom blocker with screen stitching 26. Typically, the height of the bladder socket without a fertilizer cartridge is defined by the layers of the bottom surface blocker 14, the screen 24 and the water-permeable barrier 12. The height of the bladder is minimal so as to allow the bladder to be installed between the root system and the tree without the collar rot concerns described above, and with minimal impact on the trunk. In one example, the height of the bladder socket is about one-eighth of an inch. Other examples include a variety of heights, depending on the thickness of the bladder components.

Figure 4A:
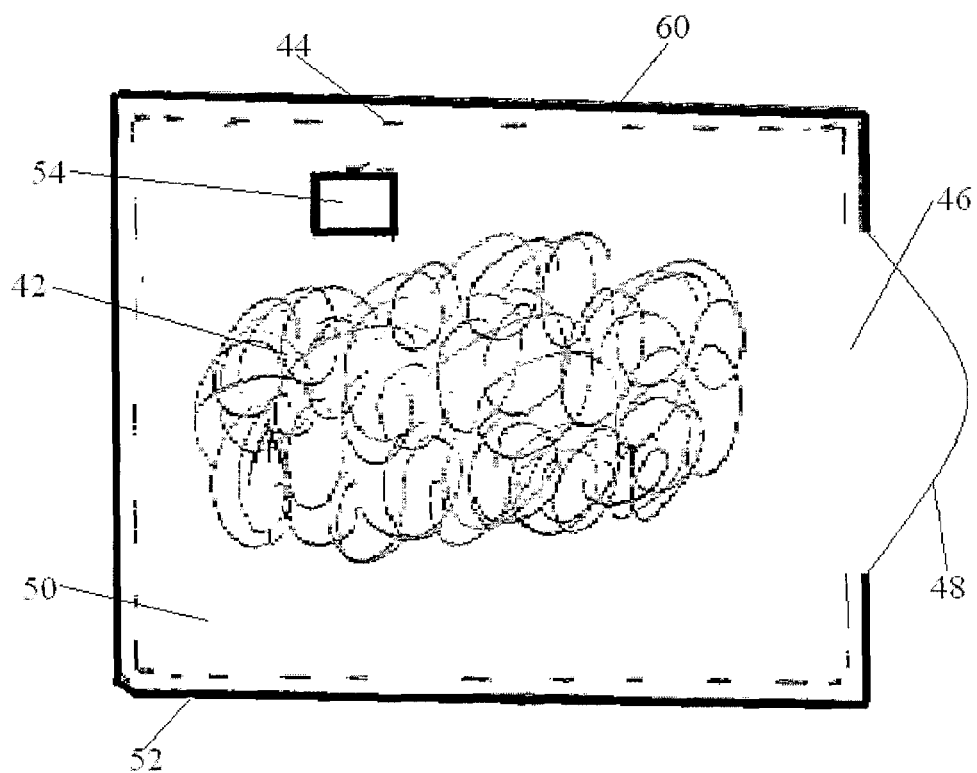
FIG. 4A is a top view of one embodiment of an organic cartridge assembly.
Figure 4B:
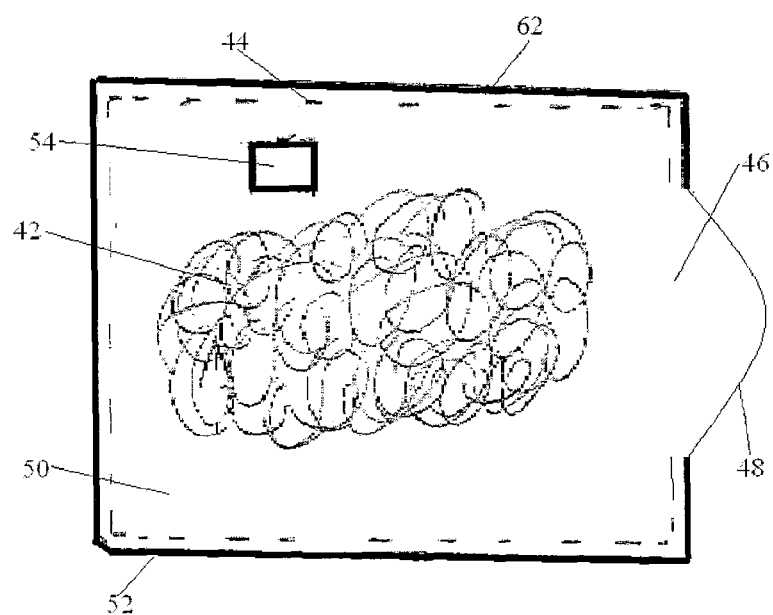
FIG. 4B is a top view of one embodiment of a non-organic cartridge assembly.
Figure 4C:
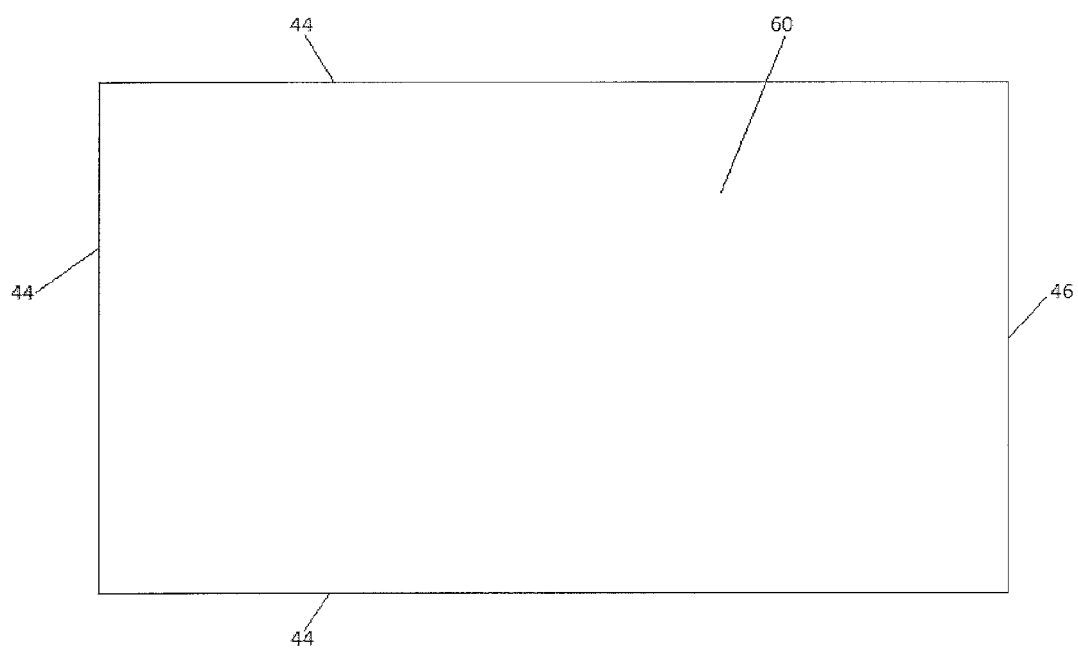
FIG. 4C is a top view of one embodiment of a cartridge assembly.

FIGS. 4A and 4B illustrate particular organic and non-organic fertilizer cartridges 60 and 62, respectively, to provide point-source fertilizer for the vine, tree or the like. The cartridges may take a variety of shapes, styles, and sizes for the particular fertilizer application and/or convenience of its user, for example to be easily inserted into the sleeve of the bladder socket. Further, as shown in FIG. 4C, the cartridge 60 may be constructed of biodegradable material, thus minimizing ground maintenance upkeep. For instance, after the fertilizer in the cartridge has been depleted, a new cartridge may be simply inserted into the sleeve.

The cartridge includes a top surface 50 and a bottom surface 52 that are generally affixed together to define a cavity for fertilizer. Cartridge stitching 44 may secure the top surface 50 and the bottom surface 52. As shown in FIGS. 5A and 5B, at least three sides of the periphery of the top surface 50 and the bottom surface 52 may be stitched together. The opening 46 side of the cartridge may be unstitched, or partially stitched as shown in the Figures. In particular examples, the cartridge stitching 44 includes 0.0025 inch threads, with a threading pattern of about five stitches per inch. However, other examples include a variety of stitching sizes and patterns to generally secure the top surface 50 and the bottom surface 52. The opening 46 allows fertilizer to be packed into the cartridge and a seal 48 may then seal the filled cartridge. A label 54 may designate the particular fertilizer composition. The soil composition of vineyards is an important viticulture consideration when growing grape vines. For instance, the soil supports the root structure of the vine and influences the drainage levels and type/amount of minerals and nutrients that the vine is exposed to. Therefore, after the soil is tested, any of the cartridges 60, 62 shown and described herein may be used that include specific fertilizer compositions to support healthy growth of the vine and provide needed nutrients and minerals. In some examples, the cartridges include nitrogen, which may be assimilated in the form of nitrates; phosphates, which may encourage root development; potassium, which may improve the vine metabolisms and increase health for future crops; calcium, for instance to help neutralize soil pH levels; iron, for instance to assist in the photosynthesis process; and/or magnesium, for a helpful component of chlorophyll.

Therefore, particular embodiments of the cartridge include a variety of fertilizer compositions to complement the local soil inadequacies and/or tree demands. For instance, successful fertilizing results may include replacing cartridge inserts several times a year, including seasonally, i.e. during the winter, spring, fall and/or summer to meet a particular nutrient demand of the vine during the specific time of year. One embodiment is illustrated in FIG. 4A, wherein the organic cartridge 60 includes about eleven pounds of organic fertilizer 42. For instance, the organic fertilizer may be comprised of leaf compost, or the like. Other organic cartridge examples include any of the examples shown below, or combinations thereof to meet a particular application demand:

Example 1: Composted Goat Waste Embodiment

| Nutrient | Measurement (ppm) | Estimate available to the first crop (lb/ton) |
|---|---|---|
| N | 32000 | 13.5 N |
| P | 7650 | 11.1 P2O5 |
| K | 35400 | 35.9 K2O |
| Ca | 30000 | 19 Ca |
| Mg | 8140 | 5.16 Mg |
| S | 4350 | 2.76 S |
| Fe | 820 | 0.52 Fe |
| Mn | 935 | 0.59 Mn |
| Zn | 191 | 0.12 Zn |
| Cu | 33.4 | 0.02 Cu |
| B | 55.9 | 0.04 B |
| Na | 8250 | 8.72 Na |
| C | 367000 | |

In this particular example, the cartridge may have a pH of about 8; a DM of 52%; and a carbon to nitrogen ration of about 11.5 to 1.

Example 2: Composted Poultry Waste Embodiment

| Nutrient | Measurement (ppm) | Estimate available to the first crop (lb/ton) |
|---|---|---|
| N | 25000 | 11.0 N |
| P | 29900 | 45.4 P2O5 |
| K | 17200 | 18.2 K2O |
| Ca | 136000 | 89.7 Ca |
| Mg | 8690 | 5.7 Mg |
| S | 6800 | 4.5 S |
| Fe | 4700 | 3.11 Fe |
| Mn | 921 | 0.61 Mn |
| Zn | 851 | 0.56 Zn |
| Cu | 261 | 0.17 Cu |
| B | 68.6 | 0.05 B |
| Na | 5450 | 6.01 Na |
| C | 173000 | |

In this particular example, the cartridge may have a pH of about 6.8; a DM of 55.1%; and a carbon to nitrogen ration of about 6.93 to 1.

Example 3: Composted Vegetation Residue Embodiment

| Nutrient | Measurement (ppm) | Estimate available to the first crop (lb/ton) |
|---|---|---|
| N | 9840 | 2.35 N |
| P | 1220 | 1.0 P2O5 |
| K | 1010 | 0.58 K2O |
| Ca | 19400 | 6.96 Ca |
| Mg | 1750 | 0.63 Mg |
| S | 1170 | 0.42 S |
| Fe | 3620 | 1.3 Fe |
| Mn | 1220 | 0.44 Mn |
| Zn | 111 | 0.04 Zn |
| Cu | 26.2 | 0.01 Cu |
| B | 30.9 | 0.01 B |
| Na | 228 | 0.14 Na |
| C | 306000 | |

In this particular example, the cartridge may have a pH of about 6.95; a DM of 29.8%; and a carbon to nitrogen ration of about 31.1 to 1.

Similarly, FIG. 4B illustrates one example of a non-organic cartridge 62. Particular examples include a non-organic cartridge 62 of about seven pounds of non-organic, i.e. chemical-based, fertilizer 42. Other non-organic cartridge examples include a variety of non-organic fertilizer compositions to meet the particular application area and/or tree demand.

Figure 5:
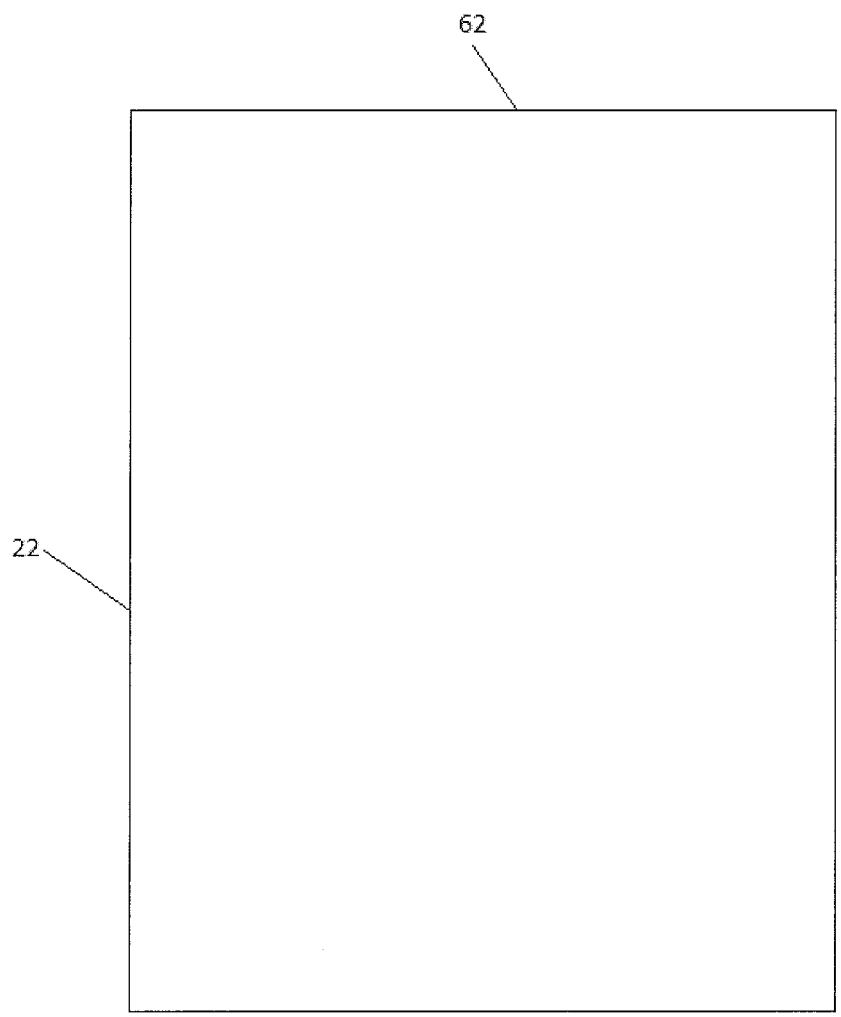
FIG. 5 is a top view of one embodiment of a secondary screen.

FIG. 5 shows one embodiment of a secondary screen 22 to cover any of the cartridges shown or described herein. In alternative embodiments of the bladder assembly, the secondary screen 22 acts as a secondary blocker to protect the cartridge and contents from ground surface animals and the like. The cartridge may be inserted into the secondary screen and then the secondary screen may be installed in the bladder, for instance within the sleeve. As shown in FIG. 5, the secondary screen 22 includes at least one opening 62 to receive the cartridge. A fastener may secure the cartridge within the secondary screen 22. Useful fasteners include Velcro, buttons and the like. The secondary screen 22 may be reusable, e.g. the secondary screen 22 may be removed after the fertilizer cartridge has been depleted and a new cartridge may be inserted into the secondary screen 22, and may then be installed within the sleeve opening.

Figures 6A, 6B:
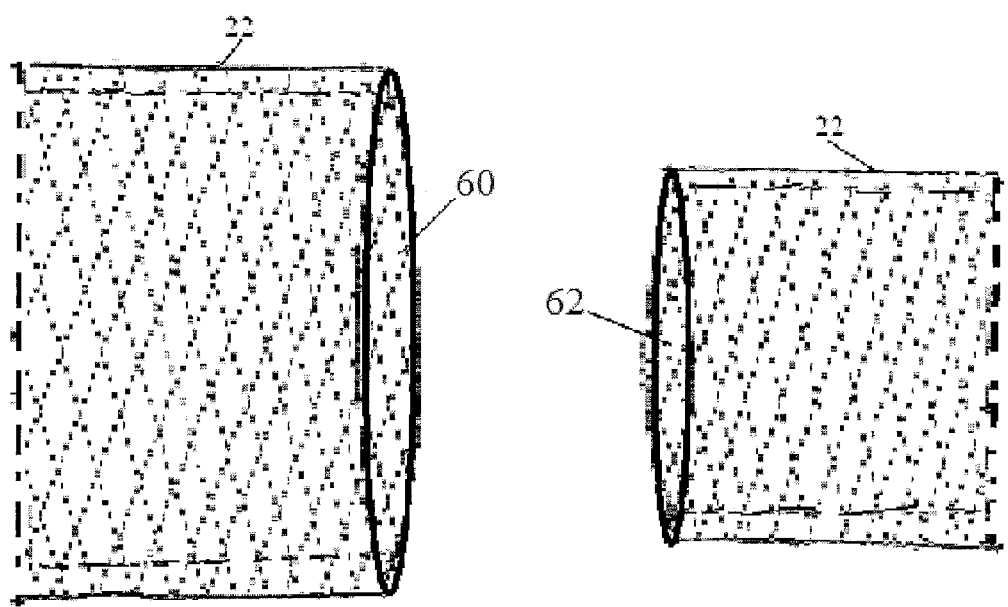
FIG. 6A is an isolated, side-perspective view of a secondary screen and organic cartridge embodiment.
FIG. 6B is an isolated, side-perspective view of a secondary screen and non-organic cartridge embodiment.

FIG. 6A shows one embodiment of a secondary screen 22 housing a large organic fertilizer cartridge 60. Similarly, FIG. 6B shows one embodiment of a secondary screen 22 housing a non-organic fertilizer cartridge 62. Other embodiments include more than one size secondary screen 22 to match the corresponding size of the fertilizer cartridge.

FIG. 7 shows one embodiment of a partially assembled bladder system. As illustrated, the cartridge 60 is positioned within a secondary screen 22. The secondary screen 22 is positioned within the sleeve of bladder below the upper surface 12.

In other embodiments, the disclosure includes a fertilizer and weed-control kit. In this embodiment, the kit may comprise a bladder socket, e.g. any of the bladder elements previously shown or described, and a fertilizer cartridge, e.g. any of the cartridges shown or described. In yet other embodiments, the kit includes a secondary screen, e.g. any of the secondary screens previously shown or described.

In yet another embodiment of the disclosure, a method for assembling the bladder includes inserting a fertilizer cartridge, e.g. any of the cartridges shown or described, into a bladder socket, e.g. any of the bladder elements previously shown or described. The method may include filling the fertilizer cartridge, e.g. any of the cartridges shown or described. Further, the method may include inserting the fertilizer cartridge into a secondary screen, e.g. any of the secondary screens previously shown or described. Yet another method may include installing the bladder assembly around a trunked tree. For instance, the trunk slit may be cut, or the like, and the bladder may be semi-permanently installed around the base of the trunk above the root system.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A point-source fertilizing and weed control device for a tree having a trunk, the device comprising:
   a. a bottom surface blocker and a water-permeable barrier partially secured together to define a bladder having at least one sleeve opening;
   b. a fiberglass screen pad affixed to the bottom surface blocker; and
   c. a replaceable fertilizer cartridge removably positioned within said sleeve, and
      wherein said bladder is adapted to lay substantially parallel to the ground surface and encircle substantially three hundred and sixty degrees of the trunk for said point-source fertilizing and weed control.

2. The device of claim 1, wherein the bottom surface blocker and the water-permeable barrier are stitched together to define the bladder.

3. The device of claim 1, wherein the bladder includes a trunk slit adapted to enclose the trunk of the tree.

4. The device of claim 3, including a first secondary sleeve on one side of the trunk slit and a second secondary sleeve on the opposing side of the trunk slit.

5. The device of claim 1, wherein the fiberglass screen pad is stitched to the bottom surface blocker.

6. The device of claim 1, wherein the fertilizer cartridge includes a bottom biodegradable surface and a top biodegradable surface.

7. The device of claim 6, wherein the bottom biodegradable surface and the top biodegradable surface are stitched together along at least three sides.

8. The device of claim 1, wherein the fertilizer cartridge includes a composition chosen from an organic fertilizer and a non-organic fertilizer.

9. The device of claim 1, wherein the fertilizer cartridge includes a secondary screen.

10. A point-source fertilizing and weed control device for a tree having a trunk, the device comprising:
    a. a bottom surface blocker and a water-permeable barrier partially secured together to define a bladder having at least one sleeve opening;
    b. a screen affixed to the bottom surface blocker; and
    c. a replaceable fertilizer cartridge removably positioned within said sleeve, and
       wherein said bladder is adapted to lay substantially parallel to the ground surface and encircle substantially three hundred and sixty degrees of the trunk for said point-source fertilizing and weed control, and
       wherein the fertilizer cartridge includes a bottom biodegradable surface and a top biodegradable surface stitched to the bottom biodegradable surface along at least three sides.

11. A point-source fertilizing and weed control device for a tree having a trunk, the device comprising:
    a. a bottom surface blocker and a water-permeable barrier partially secured together to define a bladder having at least one sleeve opening;
    b. a screen affixed to the bottom surface blocker; and
    c. a replaceable fertilizer cartridge removably positioned within said sleeve and having a secondary screen, and
       wherein said bladder is adapted to lay substantially parallel to the ground surface and encircle substantially three hundred and sixty degrees of the trunk for said point-source fertilizing and weed control.

* * * * *